US008495179B2

(12) United States Patent
Habaguchi et al.

(10) Patent No.: US 8,495,179 B2
(45) Date of Patent: Jul. 23, 2013

(54) METHOD AND SYSTEM FOR FACILITATING THE EXCHANGE OF INFORMATION BETWEEN A VEHICLE AND A REMOTE LOCATION

(75) Inventors: Masayuki Habaguchi, Torrance, CA (US); Hiromitsu Yuhara, Torrance, CA (US); Tsuneo Ohno, Torrance, CA (US); Kazuya Tamura, Torrance, CA (US); Jamie Clough, Long Beach, CA (US); Rich Shannon, Menifee, CA (US); Jon Okino, Irvine, CA (US); John Gusiff, Pasadena, CA (US); Daya Appa, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/217,339

(22) Filed: Aug. 25, 2011

(65) Prior Publication Data

US 2011/0307143 A1 Dec. 15, 2011

Related U.S. Application Data

(63) Continuation of application No. 10/737,221, filed on Dec. 15, 2003, now Pat. No. 8,041,779.

(51) Int. Cl.
*G06F 15/16* (2006.01)

(52) U.S. Cl.
USPC ............................................ 709/219; 79/217

(58) Field of Classification Search
None
See application file for complete search history.

(56) References Cited

U.S. PATENT DOCUMENTS

| 3,646,580 | A | 2/1972 | Fuller et al. |
| 4,404,639 | A | 9/1983 | McGuire et al. |
| 4,989,146 | A | 1/1991 | Imajo |
| 5,157,714 | A | 10/1992 | Spicer |
| 5,173,691 | A | 12/1992 | Sumner |
| 5,182,555 | A | 1/1993 | Sumner |

(Continued)

FOREIGN PATENT DOCUMENTS

| EP | 0973299 | 1/2000 |
| EP | 1137210 | 9/2001 |

(Continued)

OTHER PUBLICATIONS

European Search Report dated Jun. 29, 2012 in European Patent Application No. 12161455.6-2211.

(Continued)

*Primary Examiner* — William Goodchild
(74) *Attorney, Agent, or Firm* — Plumsea Law Group, LLC

(57) ABSTRACT

The present invention is directed to a system and method that includes a vehicle that exchanges information with the remote location by way of a communication network. A remote server transmits vehicle-related information to the vehicle by way of a communication system. Information may also be broadcast to and received by the vehicle by way of a broadcast communication system. A receiver of the vehicle provides user access to only a subset of the broadcast information based on user preferences of a user profile. The user may update the user profile by accessing and updating it at either the vehicle or by accessing a database. The user may access the database through a network, such as the Internet. The vehicle also selectively transmits vehicle-related information to the remote location when a predetermined event occurs. The vehicle-related information is compiled and analyzed at the remote location, and the analyzed information is transmitted back to the vehicle.

20 Claims, 6 Drawing Sheets

U.S. PATENT DOCUMENTS

| | | |
|---|---|---|
| 5,359,529 A | 10/1994 | Snider |
| 5,388,045 A | 2/1995 | Kamiya et al. |
| 5,420,794 A | 5/1995 | James |
| 5,442,553 A | 8/1995 | Parrillo |
| 5,445,347 A | 8/1995 | Ng |
| 5,506,773 A | 4/1996 | Takaba et al. |
| 5,508,931 A | 4/1996 | Snider |
| 5,546,305 A | 8/1996 | Kondo |
| 5,551,064 A | 8/1996 | Nobbe et al. |
| 5,563,788 A | 10/1996 | Yoon |
| 5,575,645 A | 11/1996 | Jacobs et al. |
| 5,590,040 A | 12/1996 | Abe et al. |
| 5,635,924 A | 6/1997 | Tran et al. |
| 5,636,245 A | 6/1997 | Ernst et al. |
| 5,648,768 A | 7/1997 | Bouve |
| 5,649,300 A | 7/1997 | Snyder et al. |
| 5,661,787 A | 8/1997 | Pocock |
| 5,664,948 A | 9/1997 | Dimitriadis et al. |
| 5,671,195 A | 9/1997 | Lee |
| 5,682,525 A | 10/1997 | Bouve et al. |
| 5,696,676 A | 12/1997 | Takaba |
| 5,699,056 A | 12/1997 | Yoshida |
| 5,774,827 A | 6/1998 | Smith et al. |
| 5,802,545 A | 9/1998 | Coverdill |
| 5,862,510 A | 1/1999 | Saga et al. |
| 5,864,305 A | 1/1999 | Rosenquist |
| 5,878,056 A | 3/1999 | Black et al. |
| 5,892,463 A | 4/1999 | Hikita et al. |
| 5,926,108 A | 7/1999 | Wicks et al. |
| 5,931,878 A | 8/1999 | Chapin, Jr. |
| 5,959,577 A | 9/1999 | Fan et al. |
| 5,964,811 A | 10/1999 | Ishii et al. |
| 5,982,298 A | 11/1999 | Lappenbusch et al. |
| 5,999,882 A | 12/1999 | Simpson et al. |
| 6,032,046 A | 2/2000 | Nakano |
| 6,073,007 A | 6/2000 | Doyle |
| 6,078,865 A | 6/2000 | Koyanagi |
| 6,085,146 A | 7/2000 | Kuribayashi et al. |
| 6,111,521 A | 8/2000 | Mulder et al. |
| 6,169,894 B1 | 1/2001 | McCormick et al. |
| 6,195,602 B1 | 2/2001 | Hazama et al. |
| 6,208,935 B1 | 3/2001 | Yamada et al. |
| 6,212,388 B1 | 4/2001 | Seo |
| 6,236,330 B1 | 5/2001 | Cohen |
| 6,240,364 B1 | 5/2001 | Kerner et al. |
| 6,243,647 B1 | 6/2001 | Berstis et al. |
| 6,246,320 B1 | 6/2001 | Monroe |
| 6,266,607 B1 | 7/2001 | Meis et al. |
| 6,266,608 B1 | 7/2001 | Pertz |
| 6,292,723 B1 | 9/2001 | Brogan et al. |
| 6,297,748 B1 | 10/2001 | Lappenbusch et al. |
| 6,298,423 B1 | 10/2001 | Johnson et al. |
| 6,308,120 B1 | 10/2001 | Good |
| 6,317,686 B1 | 11/2001 | Ran |
| 6,329,925 B1 | 12/2001 | Skiver et al. |
| 6,330,499 B1 | 12/2001 | Chou et al. |
| 6,335,729 B2 | 1/2002 | Nunokawa et al. |
| 6,339,736 B1 | 1/2002 | Moskowitz et al. |
| 6,351,709 B2 | 2/2002 | King et al. |
| 6,356,822 B1 | 3/2002 | Diaz et al. |
| 6,362,730 B2 | 3/2002 | Razavi et al. |
| 6,370,454 B1 | 4/2002 | Moore |
| 6,373,883 B1 | 4/2002 | Soerensen et al. |
| 6,381,533 B1 | 4/2002 | Crane et al. |
| 6,389,337 B1 | 5/2002 | Kolls |
| 6,397,067 B1 | 5/2002 | Tanaka et al. |
| 6,408,307 B1 | 6/2002 | Semple et al. |
| 6,421,593 B1 | 7/2002 | Kempen et al. |
| 6,434,455 B1 | 8/2002 | Snow et al. |
| 6,438,490 B2 | 8/2002 | Ohta |
| 6,459,961 B1 | 10/2002 | Obradovich et al. |
| 6,477,452 B2 | 11/2002 | Good |
| 6,480,105 B2 | 11/2002 | Edwards |
| 6,480,145 B1 | 11/2002 | Hasegawa |
| 6,510,317 B1 | 1/2003 | Marko et al. |
| 6,522,250 B1 | 2/2003 | Ernst et al. |
| 6,526,335 B1 | 2/2003 | Treyz et al. |
| 6,529,143 B2 | 3/2003 | Mikkola et al. |
| 6,539,269 B1 | 3/2003 | Jarrow et al. |
| 6,539,302 B1 | 3/2003 | Bender et al. |
| 6,542,794 B2 | 4/2003 | Obradovich et al. |
| 6,542,822 B1 | 4/2003 | Froeberg |
| 6,549,833 B2 | 4/2003 | Katagishi et al. |
| 6,552,682 B1 | 4/2003 | Fan |
| 6,553,289 B2 | 4/2003 | Maki et al. |
| 6,553,290 B1 | 4/2003 | Pillar |
| 6,553,308 B1 | 4/2003 | Uhlmann et al. |
| 6,553,313 B1 | 4/2003 | Froeberg |
| 6,577,934 B2 | 6/2003 | Matsunaga et al. |
| 6,583,734 B2 | 6/2003 | Bates et al. |
| 6,587,759 B2 | 7/2003 | Obradovich et al. |
| 6,587,777 B1 | 7/2003 | St. Pierre |
| 6,587,787 B1 | 7/2003 | Yokota |
| 6,590,507 B2 | 7/2003 | Burns |
| 6,594,576 B2 | 7/2003 | Fan et al. |
| 6,597,904 B1 | 7/2003 | Neustein |
| 6,603,405 B2 | 8/2003 | Smith |
| 6,604,038 B1 | 8/2003 | Lesesky et al. |
| 6,609,004 B1 | 8/2003 | Morse et al. |
| 6,611,201 B1 | 8/2003 | Bishop et al. |
| 6,611,740 B2 | 8/2003 | Lowrey et al. |
| 6,611,753 B1 | 8/2003 | Millington |
| 6,615,130 B2 | 9/2003 | Myr |
| 6,615,133 B2 | 9/2003 | Boies et al. |
| 6,615,186 B1 | 9/2003 | Kolls |
| 6,618,669 B2 | 9/2003 | Ota et al. |
| 6,633,238 B2 | 10/2003 | Lemelson et al. |
| 6,636,721 B2 | 10/2003 | Threadgill et al. |
| 6,647,417 B1 | 11/2003 | Hunter et al. |
| 6,654,600 B1 | 11/2003 | Pollak et al. |
| 6,657,558 B2 | 12/2003 | Horita et al. |
| 6,658,485 B1 | 12/2003 | Baber et al. |
| 6,662,090 B2 | 12/2003 | Toyama et al. |
| 6,662,091 B2 | 12/2003 | Wilson et al. |
| 6,664,922 B1 | 12/2003 | Fan |
| 6,668,219 B2 | 12/2003 | Hwang et al. |
| 6,677,854 B2 | 1/2004 | Dix |
| 6,680,694 B1 | 1/2004 | Knockeart et al. |
| 6,681,120 B1 | 1/2004 | Kim |
| 6,691,025 B2 | 2/2004 | Reimer |
| 6,697,633 B1 | 2/2004 | Dogan et al. |
| 6,701,231 B1 | 3/2004 | Borugian |
| 6,701,232 B2 | 3/2004 | Yamaki |
| 6,707,421 B1 | 3/2004 | Drury et al. |
| 6,711,398 B1 | 3/2004 | Talaie et al. |
| 6,714,797 B1 | 3/2004 | Rautila |
| 6,720,920 B2 | 4/2004 | Breed et al. |
| 6,721,685 B2 | 4/2004 | Kodama |
| 6,724,827 B1 | 4/2004 | Patsiokas et al. |
| 6,730,940 B1 | 5/2004 | Steranka et al. |
| 6,732,031 B1 | 5/2004 | Lightner et al. |
| 6,735,416 B1 | 5/2004 | Marko et al. |
| 6,735,504 B2 | 5/2004 | Katagishi et al. |
| 6,738,697 B2 | 5/2004 | Breed |
| 6,741,188 B1 | 5/2004 | Miller et al. |
| 6,741,834 B1 | 5/2004 | Godwin |
| 6,748,317 B2 | 6/2004 | Maruyama et al. |
| 6,754,485 B1 | 6/2004 | Obradovich et al. |
| 6,754,570 B2 | 6/2004 | Iihoshi et al. |
| 6,757,712 B1 | 6/2004 | Bastian et al. |
| 6,785,551 B1 | 8/2004 | Richard |
| 6,798,358 B2 | 9/2004 | Joyce et al. |
| 6,804,490 B2 | 10/2004 | Cook et al. |
| 6,804,589 B2 | 10/2004 | Foxford et al. |
| 6,810,323 B1 | 10/2004 | Bullock et al. |
| 6,812,860 B1 | 11/2004 | Schwarzwalder, Jr. |
| 6,812,888 B2 | 11/2004 | Drury et al. |
| 6,813,549 B2 | 11/2004 | Good |
| 6,816,778 B2 | 11/2004 | Diaz |
| 6,819,986 B2 | 11/2004 | Hong et al. |
| 6,823,169 B2 | 11/2004 | Marko et al. |
| 6,823,263 B1 | 11/2004 | Kelly et al. |
| 6,836,539 B2 | 12/2004 | Katou et al. |
| 6,836,667 B1 | 12/2004 | Smith, Jr. |
| 6,847,871 B2 | 1/2005 | Malik et al. |
| 6,847,872 B2 | 1/2005 | Bodin et al. |
| 6,847,889 B2 | 1/2005 | Park et al. |

| | | |
|---|---|---|
| 6,850,823 B2 | 2/2005 | Eun et al. |
| 6,859,720 B2 | 2/2005 | Satoh et al. |
| 6,870,487 B2 | 3/2005 | Nuesser et al. |
| 6,871,067 B2 | 3/2005 | Clark et al. |
| 6,901,374 B1 | 5/2005 | Himes |
| 6,911,918 B2 | 6/2005 | Chen |
| 6,920,382 B2 | 7/2005 | Katagishi et al. |
| 6,928,423 B1 | 8/2005 | Yamanaka |
| 6,944,430 B2 | 9/2005 | Berstis |
| 6,971,070 B2 | 11/2005 | Obradovich et al. |
| 6,983,200 B2 | 1/2006 | Bodin et al. |
| 6,987,964 B2 | 1/2006 | Obradovich et al. |
| 6,988,034 B1 | 1/2006 | Marlatt et al. |
| 6,990,407 B1 | 1/2006 | Mbekeani et al. |
| 6,993,421 B2 | 1/2006 | Pillar et al. |
| 6,995,686 B2 | 2/2006 | Gosdin et al. |
| 7,096,115 B1 | 8/2006 | Groth et al. |
| 7,139,659 B2 | 11/2006 | Mbekeani et al. |
| 7,170,390 B2 | 1/2007 | Quinones et al. |
| 7,174,301 B2 | 2/2007 | Florance et al. |
| 7,184,866 B2 | 2/2007 | Squires et al. |
| 7,210,142 B2 | 4/2007 | Hilt et al. |
| 7,216,109 B1 | 5/2007 | Donner |
| 7,292,848 B2 | 11/2007 | Mazzara et al. |
| 7,307,513 B2 | 12/2007 | Shutter et al. |
| 2001/0001848 A1 | 5/2001 | Oshizawa et al. |
| 2001/0034220 A1 | 10/2001 | Berstis |
| 2002/0002534 A1 | 1/2002 | Davis et al. |
| 2002/0016655 A1 | 2/2002 | Joao |
| 2002/0029339 A1 | 3/2002 | Rowe |
| 2002/0032507 A1 | 3/2002 | Diaz et al. |
| 2002/0044049 A1 | 4/2002 | Saito et al. |
| 2002/0049531 A1 | 4/2002 | Tanaka et al. |
| 2002/0061758 A1 | 5/2002 | Zarlengo et al. |
| 2002/0067289 A1 | 6/2002 | Smith |
| 2002/0072378 A1 | 6/2002 | Gaal |
| 2002/0073012 A1 | 6/2002 | Lowell et al. |
| 2002/0077741 A1 | 6/2002 | Hanebrink |
| 2002/0080022 A1 | 6/2002 | Edwards |
| 2002/0087237 A1 | 7/2002 | Ol et al. |
| 2002/0087330 A1 | 7/2002 | Lee et al. |
| 2002/0103582 A1* | 8/2002 | Ohmura et al. ................ 701/33 |
| 2002/0103583 A1 | 8/2002 | Ohmura et al. |
| 2002/0103597 A1 | 8/2002 | Takayama et al. |
| 2002/0152021 A1 | 10/2002 | Ota et al. |
| 2002/0152115 A1 | 10/2002 | Morita et al. |
| 2002/0156692 A1 | 10/2002 | Squeglia |
| 2002/0161495 A1 | 10/2002 | Yamaki |
| 2002/0161841 A1 | 10/2002 | Kinnunen |
| 2002/0165662 A1 | 11/2002 | Maruyama et al. |
| 2002/0165665 A1 | 11/2002 | Kim |
| 2002/0176494 A1 | 11/2002 | Zhao et al. |
| 2002/0177926 A1 | 11/2002 | Lockwood et al. |
| 2002/0193923 A1 | 12/2002 | Toyama et al. |
| 2002/0198632 A1 | 12/2002 | Breed et al. |
| 2002/0198637 A1 | 12/2002 | Shibata |
| 2003/0028297 A1 | 2/2003 | Iihoshi et al. |
| 2003/0051239 A1 | 3/2003 | Hudspeth |
| 2003/0063628 A1 | 4/2003 | Marko et al. |
| 2003/0069683 A1 | 4/2003 | Lapidot et al. |
| 2003/0071587 A1 | 4/2003 | Suzuki et al. |
| 2003/0083813 A1 | 5/2003 | Park |
| 2003/0093476 A1 | 5/2003 | Syed |
| 2003/0095038 A1 | 5/2003 | Dix |
| 2003/0098782 A1 | 5/2003 | Eastman et al. |
| 2003/0109972 A1 | 6/2003 | Tak |
| 2003/0117982 A1 | 6/2003 | Minnick |
| 2003/0119502 A1 | 6/2003 | Yokota |
| 2003/0158640 A1 | 8/2003 | Pillar et al. |
| 2003/0169182 A1 | 9/2003 | Wilhelm et al. |
| 2003/0191583 A1 | 10/2003 | Uhlmann et al. |
| 2003/0195695 A1 | 10/2003 | Maruyama et al. |
| 2003/0195814 A1* | 10/2003 | Striemer ........................ 705/26 |
| 2003/0216859 A1 | 11/2003 | Martell et al. |
| 2003/0225516 A1 | 12/2003 | DeKock et al. |
| 2003/0229441 A1 | 12/2003 | Pechatnikov et al. |
| 2003/0236613 A1 | 12/2003 | Satoh et al. |
| 2004/0012501 A1 | 1/2004 | Mazzara et al. |
| 2004/0024753 A1 | 2/2004 | Chane et al. |
| 2004/0044605 A1 | 3/2004 | Kress Bodin et al. |
| 2004/0059781 A1 | 3/2004 | Yoakum et al. |
| 2004/0068362 A1 | 4/2004 | Maekawa et al. |
| 2004/0068364 A1 | 4/2004 | Zhao et al. |
| 2004/0073356 A1 | 4/2004 | Craine |
| 2004/0075774 A1 | 4/2004 | Chang et al. |
| 2004/0080430 A1 | 4/2004 | Videtich |
| 2004/0085198 A1 | 5/2004 | Saito et al. |
| 2004/0093243 A1 | 5/2004 | Bodin |
| 2004/0102898 A1 | 5/2004 | Yokota et al. |
| 2004/0104842 A1 | 6/2004 | Drury et al. |
| 2004/0110515 A1 | 6/2004 | Blumberg et al. |
| 2004/0138790 A1* | 7/2004 | Kapolka et al. ................ 701/29 |
| 2004/0148099 A1 | 7/2004 | Kim |
| 2004/0167707 A1 | 8/2004 | Bragansa et al. |
| 2004/0198217 A1 | 10/2004 | Lee et al. |
| 2004/0203630 A1 | 10/2004 | Wang |
| 2004/0204821 A1 | 10/2004 | Tu |
| 2004/0204842 A1 | 10/2004 | Shinozaki |
| 2004/0208204 A1 | 10/2004 | Crinon |
| 2004/0233070 A1 | 11/2004 | Finnern |
| 2004/0233101 A1 | 11/2004 | Kim |
| 2004/0239531 A1 | 12/2004 | Adamczyk |
| 2004/0249529 A1 | 12/2004 | Kelly et al. |
| 2004/0249530 A1 | 12/2004 | Kelly et al. |
| 2004/0249531 A1 | 12/2004 | Kelly et al. |
| 2004/0249532 A1 | 12/2004 | Kelly et al. |
| 2004/0252197 A1 | 12/2004 | Fraley et al. |
| 2004/0260786 A1 | 12/2004 | Barile |
| 2005/0001743 A1 | 1/2005 | Haemerle |
| 2005/0015186 A1 | 1/2005 | Kelly et al. |
| 2005/0015199 A1 | 1/2005 | Lokshin et al. |
| 2005/0021197 A1 | 1/2005 | Zimmerman et al. |
| 2005/0021199 A1 | 1/2005 | Zimmerman et al. |
| 2005/0027436 A1 | 2/2005 | Yoshikawa et al. |
| 2005/0027449 A1 | 2/2005 | Marsh |
| 2005/0033511 A1 | 2/2005 | Pechatnikov et al. |
| 2005/0038581 A1 | 2/2005 | Kapolka et al. |
| 2005/0038596 A1 | 2/2005 | Yang et al. |
| 2005/0043880 A1 | 2/2005 | Yamane et al. |
| 2005/0060070 A1 | 3/2005 | Kapolka et al. |
| 2005/0065678 A1 | 3/2005 | Smith et al. |
| 2005/0068174 A1 | 3/2005 | Oesterling et al. |
| 2005/0075095 A1 | 4/2005 | Dillon |
| 2005/0080519 A1 | 4/2005 | Oesterling et al. |
| 2005/0090951 A1 | 4/2005 | Good |
| 2005/0096811 A1 | 5/2005 | Bodin et al. |
| 2005/0125117 A1 | 6/2005 | Breed |
| 2005/0131626 A1 | 6/2005 | Ignatin |
| 2005/0137763 A1 | 6/2005 | Watkins |
| 2005/0137790 A1 | 6/2005 | Yamada et al. |
| 2005/0222760 A1 | 10/2005 | Cabral et al. |
| 2005/0273218 A1 | 12/2005 | Breed et al. |
| 2005/0288856 A1 | 12/2005 | Uyeki et al. |
| 2006/0055565 A1 | 3/2006 | Kawamata et al. |
| 2006/0116800 A1 | 6/2006 | Obradovich et al. |
| 2008/0088480 A1 | 4/2008 | Rozum et al. |
| 2008/0106436 A1 | 5/2008 | Breed |

FOREIGN PATENT DOCUMENTS

| | | |
|---|---|---|
| JP | 6276056 | 9/1994 |
| JP | 8149029 | 6/1996 |
| JP | 10150477 | 6/1998 |
| JP | 2000112978 | 4/2000 |
| JP | 2000201104 | 7/2000 |
| JP | 2000293788 | 10/2000 |
| JP | 2001168743 | 6/2001 |
| JP | 2001216555 | 8/2001 |
| JP | 2001343979 | 12/2001 |
| JP | 2002032276 | 1/2002 |
| JP | 2002077295 | 3/2002 |
| JP | 2002084298 | 3/2002 |
| JP | 2002318844 | 10/2002 |
| JP | 2002332662 | 11/2002 |
| JP | 2002334168 | 11/2002 |
| JP | 2003122785 | 4/2003 |
| JP | 2003123188 | 4/2003 |
| JP | 2003331075 | 11/2003 |
| JP | 2003346009 | 12/2003 |

OTHER PUBLICATIONS

European Search Report dated Oct. 12, 2011 in European Patent Application No. EP04814232.
Japanese Office Action dated Jul. 4, 2012 in Japanese Patent Application No. 2009-299195.
European Search Report dated Jun. 29, 2012 in European Patent Application No. 12161414.3-2211.
Jacobs et al., "The Application of a Novel Two-Way Mobile Satellite Communications and Vehicle Tracking System to the Transportation Industry", IEEE Transactions on Vehicular Technology, Feb. 1991, pp. 57-63, vol. 40, No. 1.
"The Flawed Future of Radio", Acidus' Article Published in 2600 Magazine, Release date Jan. 15, 2003, 5 pages.
"Sirius Satellite Radio—Help", Help, dated Oct. 6, 2002 by archive.org, 8 pages.
Japanese Decision of Rejection mailed Oct. 27, 2009 from Japanese Patent Application No. 2007-507441 and English translation.
Japanese Office Action dated Nov. 4, 2009 from Japanese Patent Application No. 2006-545357 and English translation.

\* cited by examiner

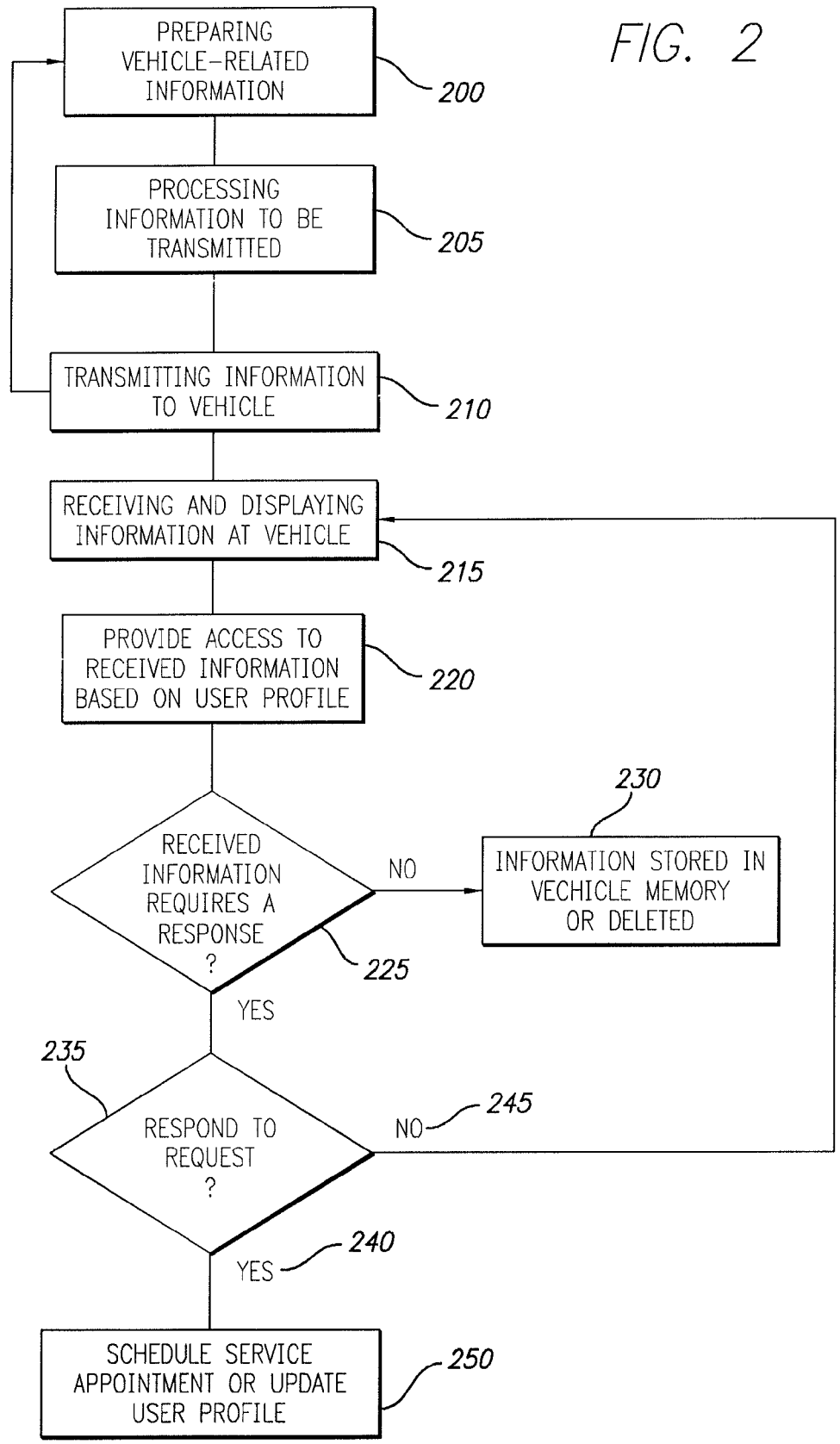

METHOD AND SYSTEM FOR FACILITATING THE EXCHANGE OF INFORMATION BETWEEN A VEHICLE AND A REMOTE LOCATION

CROSS-REFERENCE TO RELATED APPLICATION(S)

This application is a continuation of U.S. Pat. No. 8,041,779, currently U.S. application Ser. No. 10/737,221, entitled "Method And System For Facilitating The Exchange Of Information Between A Vehicle And A Remote Location," filed on Dec. 15, 2003, and issued on Oct. 18, 2011, the contents of which is hereby incorporated by reference in its entirety into this disclosure.

BACKGROUND OF THE INVENTION

1. Field of the Invention

The present invention relates to a method and system for providing information to vehicles from a remote location and for providing vehicle related information from a vehicle to the remote location.

2. Description of Related Art

The upkeep and maintenance of vehicles is essential to maintain a vehicle in good running condition and to maintain the overall reputation of a vehicle manufacturer. For example, even if a vehicle malfunctions or breaks down because of user neglect, as opposed to a vehicle defect, the reputation of the vehicle manufacturer will still be injured, especially if several vehicles malfunction because of user neglect. Thus, as users often neglect to regularly service their vehicles, upgrade their vehicles with improved replacement parts, and in some cases, even forget to replace recalled vehicle parts—it is important to remind users to service their vehicles.

Known methods to remind users are very inflexible, cumbersome and inefficient. In previous methods, vehicles were manufactured with warning lights that are activated when an event occurs. For example, maintenance reminder lights and low oil level lights are activated to remind users to bring their car to a service provider. The lights are activated only according to the time intervals and levels that were originally preprogrammed into a memory of the vehicle. Thus, if a service provider that a user often went to service his vehicle determined that a new service schedule should be used that differed from the original preprogrammed schedule, he could not update the memory to incorporate the new schedule or it would be very difficult to do so. Likewise, if a user wanted to deactivate such reminders, the user could not do so without following an intricate set of steps, which usually required the assistance of a professional service provider to carry out.

Moreover, subsequent developments, such as car part recall notices or the development of an improved part to be used in the vehicle, could not be sent to the vehicle by using such previous methods. To inform users of such developments, vehicle manufacturers and other service providers were forced to resort to mailing product brochures and the like to users. The process of mailing brochures is not only expensive, but timely, cumbersome and inefficient.

Even if a user wished to bring in his car for service in response to a warning light or receiving an updated brochure, the user would be required to locate the phone number of the service provider, contact the service provider and schedule an appointment. The user would be forced to schedule the appointment after he exited the vehicle because much of the information a user would need to make the appointment is typically not carried with the user. After exiting the vehicle, the user may forget to schedule the appointment, despite the maintenance notification lights.

Other known methods provide retail and sales information to a vehicle based on a profile of the user, but such methods do not provide vehicle-related information to a user. As a result, the other methods do not address the need to provide a convenient and flexible way to inform the user of service schedules, product recalls and other notices pertinent to the vehicle.

In addition, in known methods, users oftentimes observe the preprogrammed notices but do not comprehend the significance of the notices. In other words, users oftentimes do not understand whether they should bring the vehicle for service in response to the notice or when they should bring their vehicle in. Previous methods provided a two-way calling mechanism for the user to place a call to a live operator when the notice appears. The live operator can then explain the significance of the notice to the user. Other methods automatically send a message to the live operator when an air bag of the vehicle deploys.

Such known methods, however, are very limited and inflexible. For example, users do not have the option to determine whether information regarding the occurrence of an event should be transmitted automatically, not transmitted or transmitted on a case-by-case basis to a remote location. In the prior art methods, users do not have the option to automatically send information about the occurrence of most events to the remote location. Rather, the users must manually use the two-way calling mechanism to inform an operator that a notification light has been activated. As a result, the previous methods leave the user with limited and inflexible ways to transmit information pertaining to vehicle problems to a remote location.

Other known methods have attempted to send general information to particular vehicles, but have used very inefficient and inflexible ways to do so. For example, the known methods use one-to-one communication systems to individually send data streams to particular vehicles in an attempt to send vehicle specific data to a particular vehicle. The problem with these methods, however, is that many vehicles require the same information. For example, several vehicles might require world or national news information. The previous methods, therefore, require the transmittal of the same information several times to a plurality of vehicles, which results in a wastage of precious bandwidth.

Other methods involve the transmittal of the same information to all vehicles. The problem with these methods, however, is that many vehicles are inundated with a large amount of unwanted information and the users are required to sift through the unwanted information.

As a result, there remains a need for methods that allow for the transmittal of vehicle-related information from a remote location to a vehicle and that allow for the selective transmittal of vehicle related information from a vehicle to a remote location. There also remains a need for an efficient method for sending vehicle specific information to vehicles.

SUMMARY OF THE INVENTION

The present invention addresses the shortcomings of the prior art systems and methods. In particular, the present invention is directed to a system and method for facilitating the exchange of information between a remote location and a vehicle.

Pursuant to a first aspect of the invention, a remote server transmits vehicle-related information to the vehicle by way of a communication system. The vehicle-related information includes, for example, timely maintenance reminders, product updates and product recall notices. Sending the vehicle-related information to the vehicle provides timely notification to the vehicle user of vehicle service needs and obviates the need to provide paper correspondence via the mail system or otherwise.

Pursuant to a second aspect of the invention, all types of information, including, but not limited to vehicle-related information, is broadcast to the vehicle over a one-to-many communication system, such as, a broadcast satellite communication system. The vehicle receives the information and provides user access to only a subset of the received information. The subset of information that the user is provided access to depends on user specified options that are part of a user profile, which is stored in a vehicle information device (VID) at the vehicle. In this manner, bandwidth is preserved by broadcasting information that several vehicle users desire only once but still ferreting out undesired information at each vehicle.

In one embodiment, the user may update the user profile by accessing and updating the user profile stored at the VID or by accessing the user profile at the remote location, where it is also stored. The user may access the user profile at the remote location by way of a network, which is the Internet in one embodiment, and then update the user profile. The updated user profile is then saved at both the VID and the remote location. When the user profile is accessed at the VID, the updated user profile is saved at the VID and transmitted and stored at the remote location. When the user profile is accessed at the remote location, the updated user profile is saved at the remote location and transmitted and stored at the VID.

By allowing the user to update the user profile, the user has flexibility in the types of information, whether all types of information or just vehicle-related information, he has access to at the vehicle. As a result, each vehicle user can be free of unwanted information that is transmitted and receive only desired information.

Pursuant to a third aspect of the invention, the vehicle selectively transmits vehicle-related information to the remote location when a predetermined event occurs, such as, a low oil level warning. The predetermined events that cause the selective transmittal of information and whether the information is ever transmitted is based on user preferences that are a part of the user profile. Thus, the user has flexibility and control in determining the type of information that is shared with the remote location, and users need not be concerned about privacy or other related issues regarding the transmittal of information to the remote location.

Further, providing vehicle-related information to the remote location allows the information from a plurality of vehicles to be compiled and analyzed at the remote location. In one embodiment, the analyzed information is transmitted back to the vehicle to suggest to the vehicle user what procedure to follow in light of the predetermined event. In addition, the compiled information may be analyzed at the remote location to determine the frequency of certain malfunctions and to determine if engineering changes to the vehicle should be implemented to address the vehicle malfunctions.

In addition, instead of only sending one message as a result of only one event, a plurality of predetermined events may cause the selective transmittal of different types of information to the remote location. As a result, the remote location receives more information about the condition of a vehicle, allowing the remote location to better analyze the condition of the vehicle. The remote location can thus better inform the user of the vehicle of the significance of the vehicle condition and can better analyze vehicle malfunction trends in a plurality of vehicles.

A more complete understanding of the system and method for facilitating the exchange of information between a remote location and a vehicle will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 2 is a block diagram of a method for transmitting information from a remote location to a vehicle pursuant to aspects of the invention;

DETAILED DESCRIPTION

The present invention is directed to a system and method for facilitating the exchange of information between a remote location and a vehicle. In particular, the present invention is directed to a system and method that includes a vehicle that exchanges information with the remote location by way of a communication network.

Pursuant to a first aspect of the invention, a remote server transmits vehicle-related information to the vehicle by way of a communication system. The vehicle-related information includes, for example, timely maintenance reminders, product updates and product recall notices. Sending the vehicle-related information to the vehicle provides timely notification to the vehicle user of vehicle service needs and obviates the need to provide paper correspondence.

Pursuant to a second aspect of the invention, information is broadcasted to and received by the vehicle. A vehicle information device (VID) provides user access to only a subset of the broadcast information based on a user profile, which includes user preferences that indicate the types of information the user would like to have access to. Thus, instead of sending the same information at different bandwidths to a plurality of users that desire the same information, only a small amount of bandwidth is used. Specifically, a small amount of bandwidth is used to broadcast the same information to all users, and the VID within the vehicle makes only a subset of the broadcasted information available to the user based on the user profile.

Pursuant to a third aspect of the invention, the vehicle selectively transmits vehicle-related information to the remote location when a predetermined event occurs. The vehicle-related information includes, for example, information about service schedules or vehicle malfunctions. Providing such vehicle-related information to the remote location allows the information from a plurality of vehicles to be compiled and analyzed at the remote location. The analyzed information may then be transmitted back to the vehicle to suggest to the vehicle user what procedure to follow in light of the vehicle malfunction. In addition, the compiled information may be analyzed at the remote location to determine the frequency of certain malfunctions and to determine if engineering changes to the vehicle should be implemented to address the vehicle malfunctions.

Figure 1:
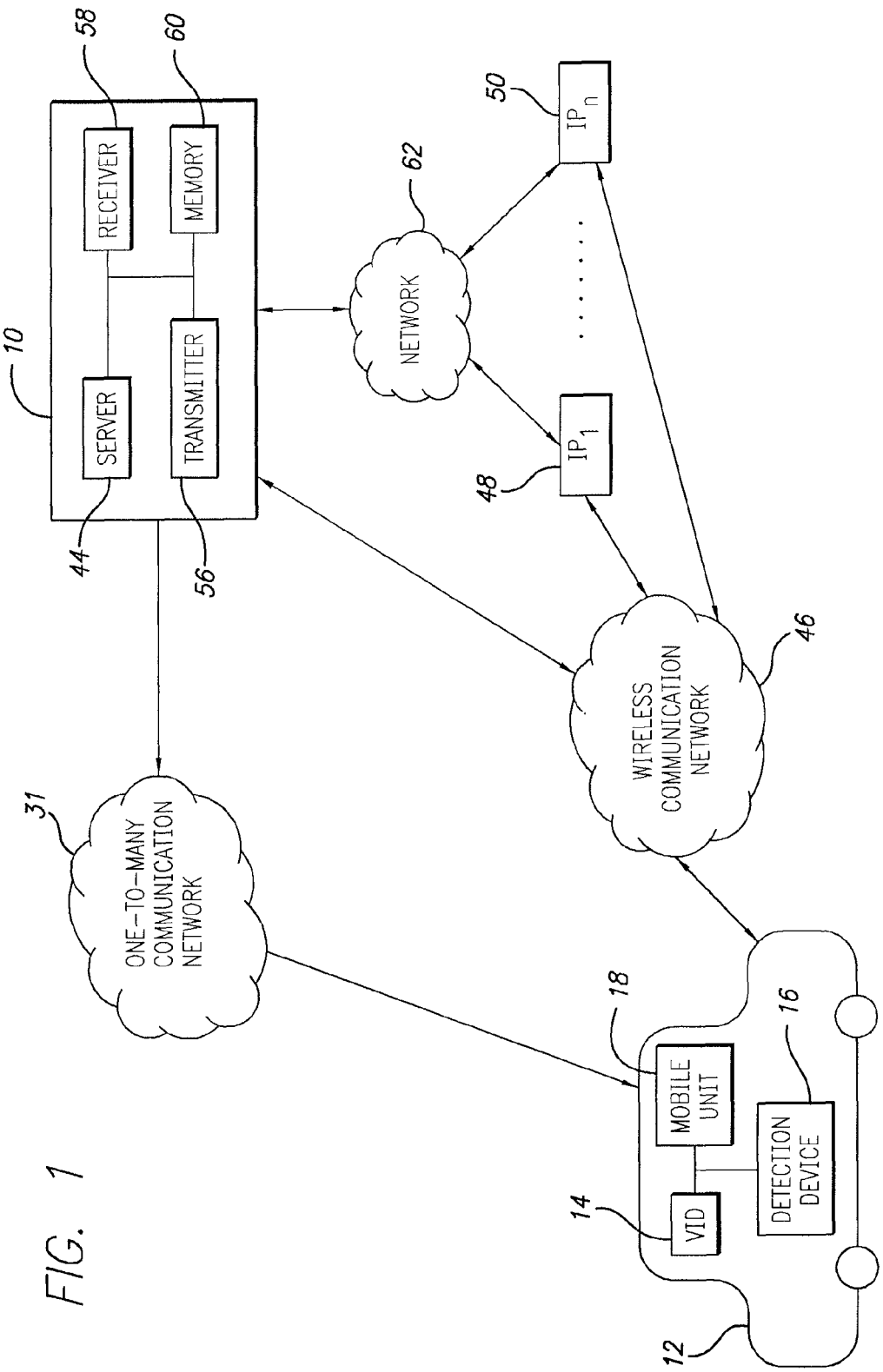
FIG. 1 is a schematic diagram of a first embodiment of a system pursuant to aspects of the invention.

FIG. 1 shows a first embodiment of a system for facilitating the exchange of information between a remote location 10 and a vehicle 12 pursuant to aspects of the invention. The vehicle 12 includes a vehicle information device (VID) 14, vehicle detection devices 16, and a mobile unit 18.

Figure 1A:
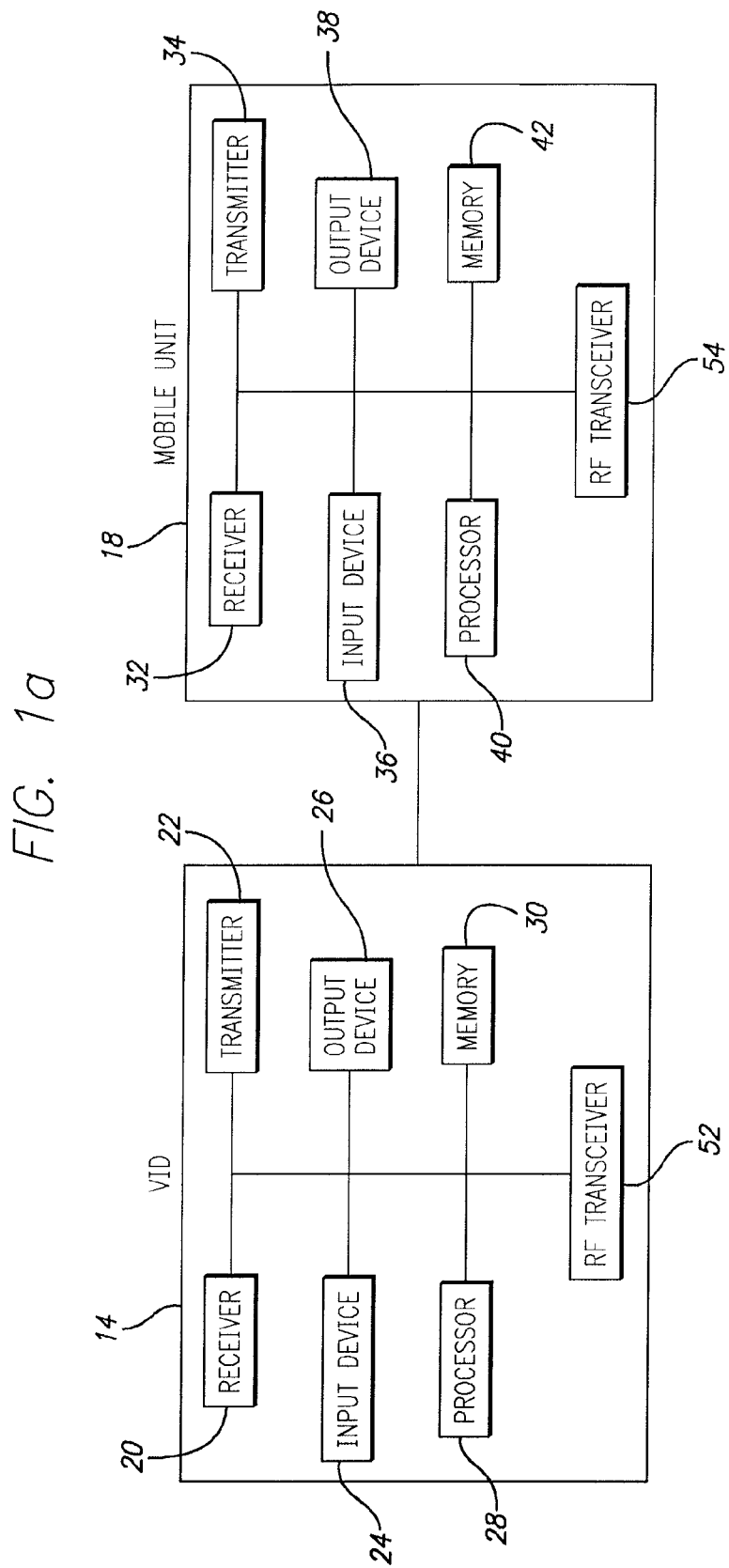
FIG. 1a is a schematic diagram of a vehicle information device (VID) in communication with a mobile unit pursuant to aspects of the invention.

As shown in FIG. 1a, the vehicle information device (VID) 14 includes a VID receiver 20, a VID transmitter 22, VID input 24 and output 26 devices, a VID processor 28, and a VID memory 30 that are all in electrical communication with one another. The VID memory 30 includes at least a portion of the user profile and, in some embodiments, includes the entire user profile. As is provided in greater detail below, the user profile stored in the VID memory 30 may be updated in the vehicle by way of the VID input device 24, which includes at least one of a keyboard, a touch sensitive display and a microphone. The user profile may also be updated by way of information received through the VID receiver 20.

The VID receiver 20 receives information from the remote location 10 and, in one embodiment, is in communication with the remote location by way of a one-to-many communication system. One-to-many communication systems include systems that can send information from one source to a plurality of receivers, such as a broadcast network 31. Broadcast networks include television, radio and satellite networks. In one embodiment, the broadcast network 31 is the XM Radio satellite network, which comprises broadcast towers, satellite servers and satellites. The information received by the VID receiver 20 may be accessed by way of the VID output device 26, which includes at least one of a VID display and a VID speaker. The VID receiver 20 and output device 26 provide access to only a subset of the received broadcasted information to the user based on user preferences. The user preferences, as well as user identity information and vehicle identity information, are part of the user profile.

The vehicle also includes vehicle detection devices 16 that are in communication with the VID 14. The vehicle detection devices 16 detect and monitor the levels and conditions of several vehicle parts. For example, one vehicle detection device 16 monitors the engine temperature and another monitors the oil level. The vehicle detection devices 16 send the monitored levels and conditions to the VID 14, which processes the information by, for example, comparing the monitored levels against threshold levels stored in the VID memory 30.

Figure 6:
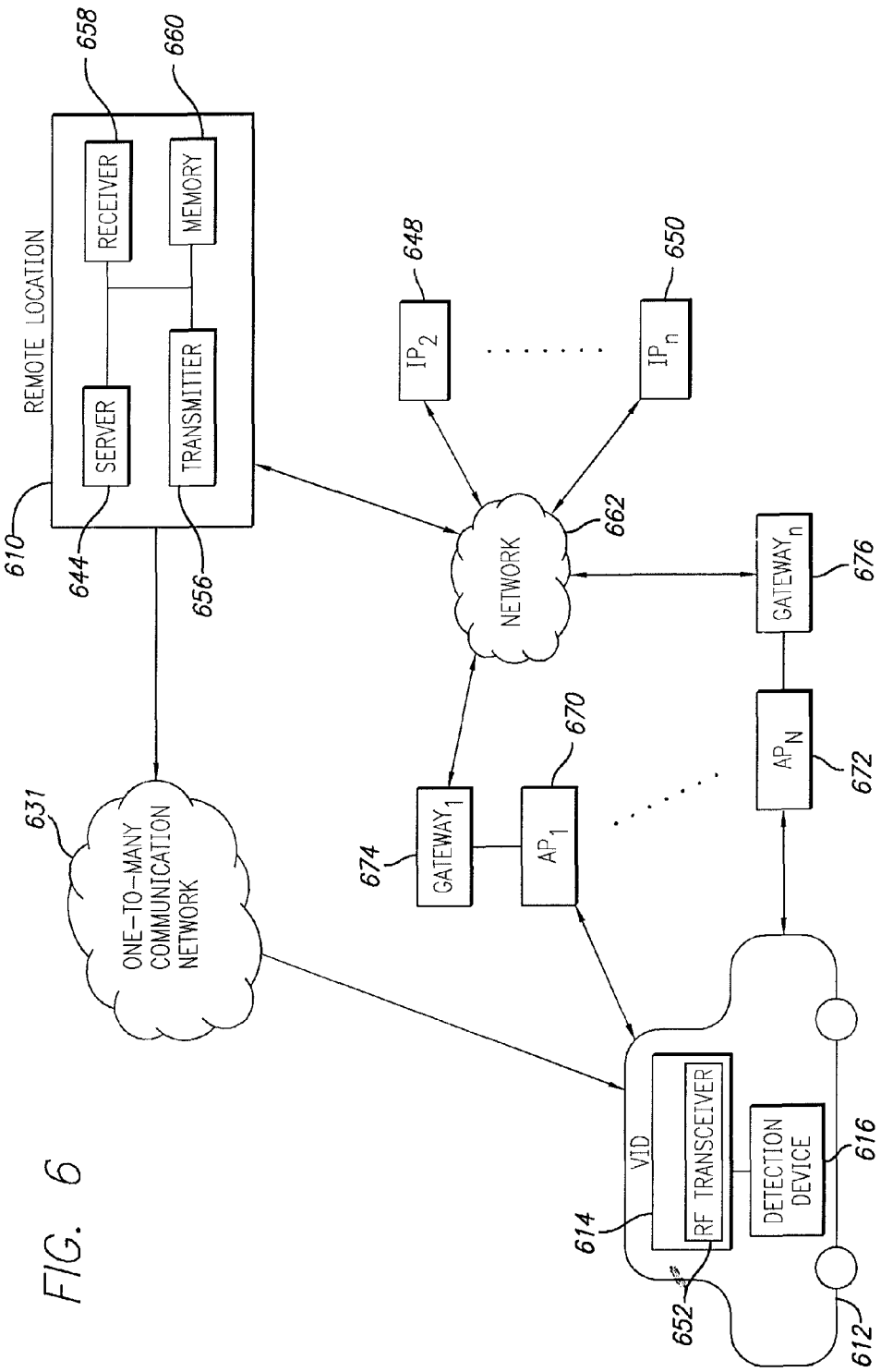

In the first embodiment, the mobile unit 18 is used to receive and transmit information from and to the remote location 10; and, in an alternate embodiment shown in FIG. 6, an RF transceiver 652 is used to receive and transmit information from and to the remote location 610. The mobile unit 18 may be a wireless phone or any other device that communicates with other devices by way of the wireless communication network 46. As shown in FIG. 1a, the mobile unit 18 includes a mobile unit receiver 32, a mobile unit transmitter 34, mobile unit input 36 and output 38 devices, a mobile unit processor 40, and a mobile unit memory 42 that are in communication with one another. The mobile unit 18 is in communication with the remote location 10 by way of the mobile unit receiver 32, the mobile unit transmitter 34, and a wireless communication network 46, which comprises numerous base stations. In one embodiment, information is transmitted from or to the vehicle or remote location over a high bandwidth GPRS/1XRTT channel of the wireless communication network 46. If the high bandwidth channel is unavailable, a low bandwidth DTMF channel is used. The mobile unit receiver 32 receives information from the remote location 10, and the mobile unit transmitter 34 transmits information to the remote location 10. In other embodiments described below in greater detail, the mobile unit transmitter 34 also transmits information to information providers 48, 50.

In one embodiment, the information received from and transmitted to the remote location 10 by way of the mobile unit 18 is accessed by the user through the VID 14, which is in communication with the mobile unit. The mobile unit 18 may be embedded in the vehicle 12 and be in communication with the VID 14 by, for example, a cable.

In another embodiment the VID 14 and mobile unit 18 are in communication with one another by way of RF transceivers 52, 54. Both the VID 14 and the mobile unit 18 include RF transceivers 52, 54, which, in one embodiment, comply with the Bluetooth® wireless data communication format. The RF transceivers 52, 54 allow the VID 14 and mobile unit 18 to communicate with one another. In other embodiments not shown, the VID and mobile unit receivers 20, 32 and transmitters 22, 34 allow the VID and mobile unit to communicate with one another. In yet other embodiments, there may be an RF transceiver that is separate from the VID 14 and mobile unit 18 and that allows the VID and mobile unit to communicate with one another.

In the alternate embodiment shown in FIG. 6, the VID 614 transmits and receives information to and from the remote location 610 by way of the RF transceiver 652, access points 670, 672 and gateways 674, 676 that are in communication with the network 662. In one embodiment, the RF transceiver 652 and access points 670, 672 are compliant with the IEEE 802.11 specification, and such transceivers and access points include Wi-Fi® certified equipment. The access points 670, 672 are typically in communication with the gateways 674, 676 by way of a cable, and the gateways are in communication with the remote location 610 by way of the network 662. The access points 670, 672 are in communication with the RF transceiver 652 and have a limited range over which they can communicate with the RF transceiver 652. Thus, it is preferable that there are numerous access points 670, 672 positioned so that the distance between the access points and the areas through which a vehicle 12 might pass is less than or equal to the limited range of the access points. When the access points 670, 672 are so positioned, the RF transceiver 652 effectively exchanges information with the access points 670, 672 and, thus, the remote location 610.

Note that, in the alternate embodiment of FIG. 6, the VID 614 also includes VID input and output devices, a VID receiver, a VID memory and a VID processor, none of which are shown. The VID components of the alternate VID embodiment 614 have the same functionality as do the VID components of the first embodiment 612.

The remote location 10, 610 includes a remote server 44, 644 a remote transmitter 56, 656 and receiver 58, 658, and a remote memory 60, 660 that are in communication with one another. As provided above, in the first embodiment, the remote transmitter and receiver 56, 58 communicate with the VID 14 and mobile unit 18 by way of the broadcast 31 and wireless 46 communication networks, respectively; and, in the alternate embodiment, the remote transmitter and receiver 656, 658 communicate with the VID 614, including the RF transceiver 652, by way of the broadcast communication network 631 and a network 662. The remote location 10, 610 is also in communication with information providers 48, 50, 648, 650 such as vehicle dealers, vehicle service providers and users of the vehicles, by way of the network 62, 662.

In both the first and alternate embodiments shown in FIGS. 1 and 6, the network 62, 662 is typically a wide area network (WAN) such as the Internet. In other embodiments, some of the information providers 48, 50, 648, 650, such as the vehicle dealers and vehicle service providers, may be in communication with the remote location 10, 610 by way of a local area network (LAN), while other information providers 48, 50, 648, 650 such as the vehicle users, are in communication with the remote location by way of the Internet. In yet other embodiments, the RF transceiver 652 is in communication with the remote location 610 and/or the information providers 648, 650 by way of a network 662 that is an LAN. In these other embodiments, the LAN 662 is compliant with the IEEE 802.3 specification or is an Ethernet network.

As provided in greater detail below, the information providers 48, 50, 648, 650 may transmit updated user profiles and new vehicle-related information to the remote location 10, 610. A plurality of user profiles are in a user profile database, which, along with other vehicle-related information, is stored in the remote memory 60, 660. The updated user profiles and new vehicle-related information are transmitted from the remote location 10, 610 to the VID 14, 614 by way of the broadcast network 31, 631. In other embodiments, the new vehicle-related information and updated user profiles may be transmitted to the vehicles 12, 612 by way of the wireless network 46 or the network 662. At the vehicle, the user profile stored in the VID memory 30 is updated, and the vehicle-related information is made accessible to the user by way of the VID output device 26. In other embodiments, the information providers may communicate directly with the mobile unit 18 or RF transceiver 652 by way of the wireless communication network 46 or the network 662.

FIG. 2 shows a first embodiment of a method for facilitating the exchange of information between a remote location and a vehicle pursuant to aspects of the invention. At step 200, vehicle-related information is prepared. Vehicle-related information includes service-related information, vehicle-promotional information and user update information, but does not include traffic-related information or retail information. Service related information includes information that concerns the upkeep and service of the vehicle, for example, vehicle maintenance schedules, oil change reminders, service campaigns, products for the vehicle, suggestions on how to more effectively use vehicle features, service recalls and car diagnosis surveys. Vehicle-promotional information includes information that concerns the commercial terms under which the vehicle was acquired, for example, new financing options, lease inspections or lease expirations.

Vehicle-related information is prepared by reviewing and updating the vehicle-related information that will be transmitted to the vehicles. Typically, an agent of the vehicle manufacturer reviews and updates the vehicle-related information and prepares a message. A supervisor reviews the agent's message prior to finalizing a message that will be broadcast to the VIDs 14, 614. For example, an agent may prepare a message showing that a product used in the vehicle has been recalled and requesting the user of the vehicle to bring the vehicle in for service so that the recalled part may be replaced. A supervisor reviews and finalizes the message before it is transmitted to the vehicles 12, 612. Note that, in other embodiments, the message prepared by the agent is broadcast without supervisor review.

In addition, the vehicle-related information may be received at the remote location 10, 610 from one of the information providers 48, 50, 648, 650, such as a vehicle service provider. Such vehicle-related information may include an updated maintenance schedule. The agent prepares a message reflecting the updated maintenance schedule, and the supervisor reviews the message. As provided above, in other embodiments, there is no supervisor review of the message prepared by the agent. In other embodiments, the information provider 48, 50, 648, 650 may send information directly to the remote location and update the vehicle-related information directly, without intervention from the agent or the supervisor.

At step 205, the vehicle-related information to be transmitted is processed for broadcasting purposes. In one embodiment, the vehicle-related information is processed by filtering the information based on predetermined criteria and translating the information into a telemetry format. Those of skill in the art will appreciate that there are several other ways to process the vehicle-related information.

At step 210, the vehicle-related information is transmitted to the VID 14, 614 by way of the communication network. The timing of the transmittal is based on a vehicle information transmittal schedule that is stored in the remote memory 60, 660. In an alternate embodiment, the vehicle-related information is broadcast to a plurality of vehicles 12, 612 by way of the broadcast network 31, 631. Note that, in the alternate embodiment, the remote location 10, 610 can broadcast several types of information, including, but not limited to, vehicle-related information, to the vehicle 12, 612. As provided below, the VID receiver 20 and VID output device 26 provide access to only a subset of the broadcasted information based on the user profile. At step 215, the vehicle-related information is received at the vehicle by either the VID receiver, VID transceiver, or mobile unit receiver 20, 652, 32. At step 220, the VID 14, 614 provides access to only a subset of the received vehicle-related information to the user based on the user profile.

The user profile includes user preferences, vehicle identification information and user information. Thus, if the user preferences are set to block a certain type of vehicle-related information, such as product updates, such vehicle-related information cannot be accessed by the user until the user modifies the user preferences to permit access. The user profile also can be used to control when the user will be provided access to the information. For example, the user may adjust the user options to only receive service maintenance update information at predetermined times or frequencies.

Pursuant to the alternate embodiment, the same information that may be pertinent to a plurality of vehicles is not retransmitted, which retransmission would waste precious bandwidth. Instead, all types of information is broadcasted only once to a plurality of vehicles 12, 612 from the remote location 10, 610 preserving a great deal of bandwidth. Meanwhile, each vehicle 12, 612 still provides user access only to information specific to the vehicle according to user preferences of the user profile that is stored in the VID memory 30. As a result, bandwidth is preserved and the user is not exposed to unwanted information.

At step 225, it must be determined whether the received information requires a response. If a response is not required, the information may either be stored in the VID memory 30 or simply deleted after a predetermined time period 230. In some cases, the received information may modify vehicle-related information stored in the VID memory 30. For example, if a service provider changes the timing or pricing of a vehicle service promotion, the new timing or pricing would modify the existing timing or pricing of the service promotion stored in the VID memory 30. Providing such vehicle-related information to the vehicle provides timely notification to the vehicle user of vehicle service needs and obviates the need to provide paper correspondence via the mail system or otherwise.

If the received information does require a response 235, the user may choose to either respond 240 or not respond 245 to the request. If the user chooses to not respond to the request 245, the method returns to step 215. If the user chooses to respond 240, he will typically either be requested to update his user profile or schedule a service appointment 250.

Figure 3:
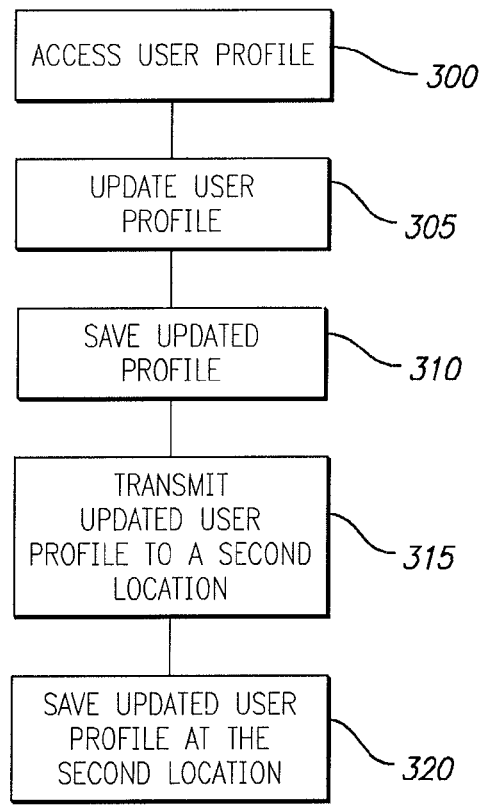
FIG. 3 is a block diagram of a method for updating a user profile pursuant to aspects of the invention.

FIG. 3 shows the steps followed to update the user profile. At step 300, the user accesses the user profile. The user may access the user profile by navigating screens on the VID display until the appropriate screen appears and entering a user login and password. The user may also access the user profile by accessing the user profile database at the remote location 10, 610 by way of the network 62, 662, in which case the user acts as an information provider 48, 50, 648, 650. In one embodiment, the user uses a personal computer and the user login and password to access the user profile database by way of the Internet. The user typically contacts the remote location 10, 610 to obtain a user login and password and uses the login and password to gain access to the database.

Note that, if ownership of the vehicle has changed, the new owner (and thus new user) of the vehicle contacts the remote location 10, 610 to obtain a new user login and password. When notified about a change in ownership, the old user preferences and identification information of the old user profile is typically deleted at the remote location and the new user is advised to enter new user preference and identification information into the user profile. In other embodiments, the old user preferences may not be deleted and the new user may opt to keep the old user's preferences.

At step 305, the user may update the user profile and change, for example, user preferences and/or user identification information. If ownership has changed, after accessing the user profile with the new user login and password, the new user enters new user preferences and/or identification information. If the old user's preferences were not deleted, the new user may update the old user preferences to reflect the new user's preferences as desired. Vehicle-identification information, such as the vehicle identification number, however, is typically not changed. At step 310, the updated user profile, including new user preferences and identification information, is saved at the VID memory 30 or the remote memory 60, 660, wherever the user accessed the user profile for updating purposes.

At step 315, the updated user profile is transmitted to a second location. If the user profile was first accessed at the VID 14, 614, the updated user profile is transmitted to the user profile database at the remote location 10, 610. If the user profile is first accessed at the user profile database at the remote location 10, 610, the user profile is transmitted from the remote location to the vehicle 12, 612. At step 320, the user profile is saved at the second location. If the user profile was transmitted to the user profile database at the remote location 10, 610, the updated user profile would be saved at the user profile database. If the updated user profile was transmitted to the vehicle 12, 612, the updated user profile would be saved at the VID memory 30.

Figure 4:
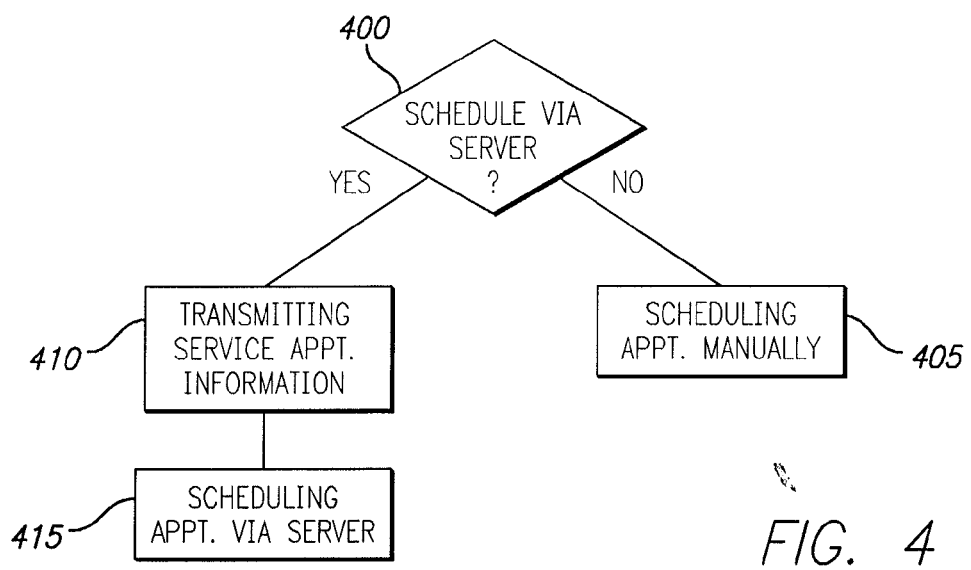
FIG. 4 is a block diagram of a method for scheduling a service appointment pursuant to aspects of the invention.

FIG. 4 shows the steps followed to schedule a service appointment. At step 400, the user chooses to schedule the service appointment manually or through the remote server 44, 644. If the user chooses to manually schedule the service appointment 405, the user may contact the service provider (which may also be an information provider 48, 50, 648, 650) and schedule a date and time for the appointment. The user typically uses the mobile unit 18 or the VID 614 that includes the RF transceiver 652 to manually schedule such an appointment.

If the user chooses to schedule the appointment through the remote server 44, 644, the user may transmit desired service appointment information to the remote server 410. The desired service appointment information includes, for example, the name, address and phone number of a preferred service provider 48, 50, 648, 650 and the time and day of the week that the user desires the appointment. In one embodiment, the desired service appointment information may be stored in the VID memory 30 and sent to the remote server 44, 644 when the user responds that he would like to schedule the appointment via the remote server. The user can also modify the desired service appointment information by updating the user profile and sending the modified desired service appointment information to the remote server 44, 644.

The remote server 44, 644 contacts the preferred service provider 48, 50, 648, 650 and attempts to schedule an appointment for the user 415 according to the desired service appointment information. If the desired time and date are unavailable, the remote server 44, 644 contacts the user and requests the user to provide additional desired service appointment information, such as an alternate date and time or an alternate dealer. The additional desired service appointment information may also be stored as part of the user profile at the VID memory 30 and sent to the remote server 44, 644 when the user is prompted for such information. The remote server 44, 644 schedules the appointment with the service provider and transmits an appropriate message to the user. Note that the user typically communicates with the remote location 10, 610 and the service provider 48, 50, 648, 650 by the mobile unit 18 and wireless network 46 or the RF transceiver 652 and the network 662. The remote location 10 typically communicates with the user by way of the VID 14, 614 and broadcast network 31, 631, the mobile unit 18 and wireless network 46 and/or the RF transceiver 652 and the network 662.

Figure 5:
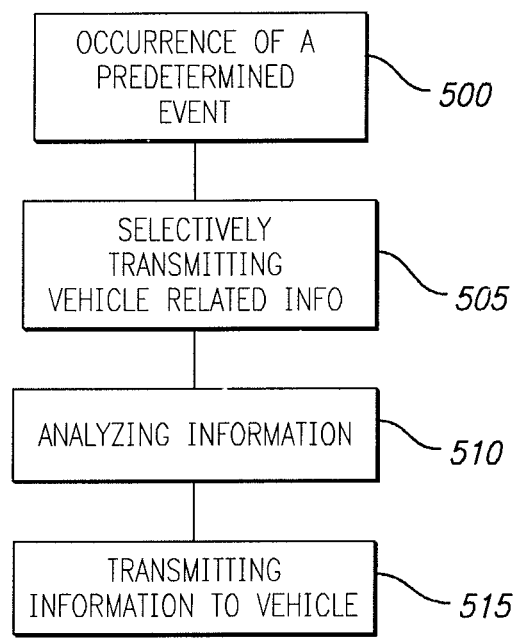
FIG. 5 is a block diagram of a method for transmitting information from a vehicle to a remote location pursuant to aspects of the invention; and, FIG. 6 is a schematic diagram of an alternate embodiment of a system pursuant to aspects of the invention.

FIG. 5 shows a second embodiment of a method for facilitating the exchange of information between a remote location 10 and a vehicle 12 pursuant to aspects of the invention. At step 500, a predetermined event occurs, and at step 505, vehicle-related information is selectively transmitted from the vehicle 12, 612 to the remote location 10, 610 after the occurrence of the predetermined event. The types of predetermined events that cause the selective transmittal of information to the remote location 10, 610 are identified in the user profile, which is stored in the VID memory 30. For example, the oil level dropping below a predetermined oil level threshold may be one predetermined event, and the oil level threshold may be stored in the user profile. Vehicle detection devices 16, 616 constantly monitor the oil level and report the oil level to the VID processor 28, which compares the monitored oil level to the oil level threshold.

If the oil level drops below the oil level threshold, a warning light may appear and, based on other user preferences, a low oil level notification is selectively transmitted to the remote location. The user preferences of the user profile may be set to determine what types of vehicle-related information may be transmitted to the remote location 10 after a predetermined event occurs. Further, the user preferences may determine whether the information is sent. For example, the user preferences may be set so that the information is automatically sent to the remote location 10, 610 upon the occurrence of an event, so that the information is not sent even if the event occurs or so that the user is prompted to transmit the information when the event occurs. If the user is prompted to transmit the information, the user may either choose to transmit the information to the remote location or choose not to transmit the information.

Permitting the user to select which predetermined events cause a selective transmittal of information and permitting the user to determine when to send vehicle-related information affords the user flexibility and control over the information that is shared with the remote location. Thus, by using the present invention, users need not be concerned about privacy or other related issues regarding the transmittal of information to the remote location 10, 610.

Note that, in other embodiments, the user may selectively transmit some vehicle-related information when a predetermined event occurs; but, to promote user safety, the vehicle manufacture may set other options that require the automatic transmittal of predetermined vehicle-related information upon the occurrence of predetermined events, regardless of user preferences. For example, if vehicle detection devices sense that the tire pressure dropped suddenly while the vehicle is moving at high speeds, a sudden tire pressure drop notification may automatically be sent to the remote location. An agent at the remote location may contact the vehicle user to determine if the user requires assistance.

At step 510, the vehicle-related information that is transmitted to the remote location 10, 610 is analyzed. The remote server 44, 644 analyzes the information and, in one embodiment, stores the analyzed information to the remote memory 60, 660. Information from a plurality of vehicles may be stored in the remote memory 60, 660, and the stored information may be further analyzed to determine trends in vehicle malfunctions. The trends may indicate whether engineering changes are necessary to the vehicle 12, 612.

At step 515, the analyzed information may be transmitted back to the vehicle 12, 612, advising the user about the significance of the predetermined event, which can include, for example, low oil levels. If necessary, the user may opt to schedule a service appointment with a service provider, as provided in FIG. 4.

Instead of relying on only one event, such as an air bag deployment, for sending information to a remote location, a plurality of predetermined events may cause the selective transmittal of information to the remote location and different types of information is transmitted to the remote location. As a result, the remote location has greater access to information concerning the condition of the vehicle 12, 612. The greater access allows the remote location 10, 610 to better analyze the condition of the vehicle 12, 612, to better inform the user of the significance of the vehicle condition and to better analyze trends in a plurality of vehicles. In sum, instead of only sending one message as a result of one event, by using several predetermined events to trigger the selective transmittal of several types of vehicle-related information, the overall condition of the vehicle may be better assessed.

Having thus described a preferred embodiment of a method and system for facilitating communication between a vehicle and a remote location, it should be apparent to those skilled in the art that certain advantages of the within system have been achieved. It should also be appreciated that various modifications, adaptations, and alternative embodiments thereof may be made within the scope and spirit of the present invention. For example, the use of broadcast communication networks has been illustrated, but it should be apparent that many of the inventive concepts described above would be equally applicable to the use of other non-broadcast communication networks. The invention is further defined by the following claims.

What is claimed is:

1. A method for providing vehicle-related information from a vehicle including a transmitter and a memory to a remote location, the method comprising:
   storing at least a portion of a user profile in a memory onboard the vehicle, the user profile including a plurality of predetermined events and user preferences;
   monitoring a condition associated with a plurality of vehicle parts using one or more vehicle detection devices in communication with the plurality of vehicle parts;
   selecting at least one predetermined event from the plurality of predetermined events in the user profile as an identified predetermined event;
   comparing the monitored condition of the plurality of vehicle parts with an associated threshold level;
   determining whether the monitored condition of the plurality of vehicle parts is above or below the associated threshold level;
   selectively transmitting vehicle-related information to the remote location when at least the identified predetermined event occurs, wherein the identified predetermined event is included in the user profile stored in the memory onboard the vehicle;
   wherein selectively transmitting vehicle-related information to the remote location further comprises the steps of:
   accessing the user preferences associated with the user profile stored in the memory onboard the vehicle;
   determining whether the user preferences include information associated with transmitting the vehicle-related information to the remote location; and
   selectively transmitting the vehicle-related information to the remote location based on the user preferences such that whether or not the vehicle-related information is transmitted to the remote location is determined from the information included in the user preferences;
   wherein the vehicle-related information contains information associated with the occurrence of the identified predetermined event, including at least one of the monitored condition and wherein the vehicle-related information is configured for receipt by the remote location; and
   receiving analyzed information about the identified predetermined event from the remote location.

2. The method according to claim 1, wherein the user preferences are configured to be updated by a user within the vehicle.

3. The method of claim 1, wherein selectively transmitting the vehicle-related information based on the user preferences further comprises automatically transmitting the vehicle-related information to the remote location upon the occurrence of the identified predetermined event occurs when the user preferences are set to automatically transmit the vehicle-related information.

4. The method of claim 1, wherein selectively transmitting the vehicle-related information based on the user preferences further comprises not transmitting the vehicle-related information to the remote location upon the occurrence of the identified predetermined event occurs when the user preferences are set to not transmit the vehicle-related information.

5. The method of claim 1, wherein selectively transmitting the vehicle-related information based on the user preferences further comprises providing a prompt to a user of the vehicle when the identified predetermined event occurs, wherein the prompt comprises a request for permission to transmit the vehicle-related information to the remote location.

6. The method of claim 1, wherein selectively transmitting the vehicle-related information based on the user preferences further comprises automatically transmitting vehicle-related information associated with at least one of the plurality of predetermined events to the remote location, regardless of the settings included in the user preferences.

7. The method of claim 1, wherein the user preferences are configured to permit a user of the vehicle to select which of the plurality of predetermined events cause the selective transmittal of vehicle-related information to the remote location; and wherein the user preferences are further configured to permit a user of the vehicle to select when the vehicle-related information is automatically transmitted to the remote location.

8. A method for providing vehicle-related information from a vehicle including a transmitter and a memory to a remote location, the method comprising:

storing at least a portion of a user profile in a memory onboard the vehicle, the user profile including a plurality of predetermined events and user preferences;

monitoring a condition associated with a plurality of vehicle parts using one or more vehicle detection devices in communication with the plurality of vehicle parts;

comparing the monitored condition of the plurality of vehicle parts with an associated threshold level;

determining whether the monitored condition of the plurality of vehicle parts is above or below the associated threshold level;

selectively transmitting vehicle-related information to the remote location when at least two predetermined events from the plurality of predetermined events occur, wherein the plurality of predetermined events include at least one of the following: a tire pressure below a predetermined tire pressure threshold level, a predetermined vehicle odometer reading, an oil level below a predetermined oil level threshold, and an engine temperature reading above a predetermined engine threshold level;

wherein selectively transmitting vehicle-related information to the remote location further comprises the steps of:

accessing the user preferences associated with the user profile stored in the memory onboard the vehicle;

determining whether the user preferences include information associated with transmitting the vehicle-related information to the remote location; and selectively transmitting the vehicle-related information to the remote location based on the user preferences such that whether or not the vehicle-related information is transmitted to the remote location is determined from the information included in the user preferences;

wherein the vehicle-related information contains information associated with the occurrence of the at least two predetermined events, including at least one of the monitored condition associated with each of the at least two predetermined events and wherein the vehicle-related information is configured for receipt by the remote location; and receiving analyzed information about a condition of the vehicle from the remote location based on the vehicle-related information associated with the at least two predetermined events.

9. The method of claim 8, wherein the vehicle-related information comprises at least one of the following: a maintenance code, a time stamp, a vehicle identification number, vehicle odometer information, vehicle oil level information, and vehicle tire pressure information.

10. The method of claim 8, wherein the step of selectively transmitting vehicle-related information to the remote location further comprises:

identifying a first predetermined event associated with a first monitored condition being above or below a first threshold level;

identifying a second predetermined event associated with a second monitored condition being above or below a second threshold level; and selectively transmitting vehicle-related information to the remote location when at least the first predetermined event and the second predetermined event occur.

11. The method of claim 8, wherein the step of selectively transmitting vehicle-related information to the remote location further comprises transmitting the vehicle-related information from a vehicle information device at the vehicle to a mobile unit at the vehicle by way of an RF transceiver in communication with the vehicle information device and the mobile unit, and transmitting the vehicle-related information from the mobile unit to the remote location by way of a wireless communication network.

12. The method of claim 11, wherein the RF transceiver is compliant with the Bluetooth® wireless communication specification.

13. The method of claim 8, wherein the step of selectively transmitting vehicle-related information to the remote location further comprises transmitting the vehicle-related information from a vehicle information device at the vehicle to a mobile unit embedded in the vehicle by way of a cable in communication with the vehicle information device and the embedded mobile unit, and transmitting the vehicle-related information from the mobile unit to the remote location by way of a wireless communication network.

14. The method of claim 8, wherein the step of receiving analyzed information about a condition of the vehicle from the remote location further comprises receiving analyzed vehicle-related information from the remote location based on stored vehicle-related information transmitted to the remote location from a plurality of vehicles.

15. The method of claim 8, wherein the user preferences are configured to permit a user of the vehicle to select which of the plurality of predetermined events cause the selective transmittal of vehicle-related information to the remote location; and wherein the user preferences are further configured to permit a user of the vehicle to select when the vehicle-related information is automatically transmitted to the remote location.

16. A method for providing vehicle-related information from a vehicle including a transmitter and a memory to a remote location, the method comprising:

storing at least a portion of a user profile in a memory onboard the vehicle, the user profile including a plurality of predetermined events and user preferences;

monitoring a condition associated with a plurality of vehicle parts using one or more vehicle detection devices in communication with the plurality of vehicle parts;

selecting at least one predetermined event from the plurality of predetermined events in the user profile as an identified predetermined event;

comparing the monitored condition of the plurality of vehicle parts with an associated threshold level;

determining whether the monitored condition of the plurality of vehicle parts is above or below the associated threshold level;

selectively transmitting vehicle-related information to the remote location when at least the identified predetermined event occurs, wherein the identified predetermined event is included in the user profile stored in the memory onboard the vehicle;

wherein selectively transmitting vehicle-related information to the remote location further comprises the steps of:

accessing the user preferences associated with the user profile stored in the memory onboard the vehicle;

determining whether the user preferences include information associated with transmitting the vehicle-related information to the remote location; and selectively transmitting the vehicle-related information to the remote location based on the user preferences such that whether or not the vehicle-related information is transmitted to the remote location is determined from the information included in the user preferences;

wherein the vehicle-related information contains information associated with the occurrence of the identified predetermined event, including at least one of the monitored condition and wherein the vehicle-related information is configured for receipt by the remote location; and scheduling a service appointment with a service provider in response to receiving analyzed information about the identified predetermined event from the remote location that indicates service is needed.

17. The method of claim 16, wherein the step of scheduling the service appointment further comprises transmitting to the remote location desired service appointment information;

wherein the desired service appointment information is included in the user preferences; and wherein the remote location is configured to schedule the service appointment with the service provider based on the transmitted desired service appointment information.

18. The method of claim 17, wherein the desired service appointment information comprises at least one of a preferred service provider and a desired appointment time.

19. The method of claim 16, further comprising storing the desired service appointment information to the memory of the vehicle.

20. The method of claim 19, further comprising modifying the desired service appointment information by updating the user profile stored onboard the vehicle.

* * * * *